United States Patent [19]

Mims et al.

[11] 4,345,960

[45] Aug. 24, 1982

[54] SYSTEM FOR AND METHOD OF LAMINATING

[75] Inventors: John D. Mims, Hopkington; Leland F. Mills, Dunbarton; Ronald I. Fowler, Pittsfield, all of N.H.

[73] Assignee: Crathern Engineering Co., Inc., Contoocook, N.H.

[21] Appl. No.: 268,197

[22] Filed: May 29, 1981

[51] Int. Cl.[3] .................................. B32B 31/00

[52] U.S. Cl. .................................. 156/264; 156/299; 156/364; 156/517; 156/562; 412/19

[58] Field of Search .................. 156/364, 556-563, 156/299-300, 264, 265, 516, 517; 11/2; 271/227

[56] References Cited

U.S. PATENT DOCUMENTS

| | | | |
|---|---|---|---|
| 2,596,068 | 5/1952 | Bunch et al. | 11/2 X |
| 2,925,612 | 2/1960 | Schramm | 11/2 |
| 3,309,038 | 6/1968 | Robison | 156/562 X |
| 3,522,129 | 7/1970 | Crathern | 156/364 |
| 3,817,157 | 6/1974 | Andresen | 156/364 |
| 3,897,945 | 8/1975 | Faltot | 156/364 X |
| 4,129,914 | 12/1978 | Jahn | 11/2 |

*Primary Examiner*—David A. Simmons

*Attorney, Agent, or Firm*—Schiller & Pandiscio

[57] ABSTRACT

An improved apparatus for and method of making laminate articles is described. The invention is particularly useful in making bookcases of the type including relatively stiff front and back cover backing sheet members and a flexible spine backing sheet member. One edge of each of the stiff and flexible backing sheet members is substantially aligned with one another, with the flexible backing sheet member precisely centered between two stiff backing sheet members. The substantially aligned edges are registered with respect to an edge of a sheet of material and the outer opposing edges of the stiff backing sheet members are precisely spaced from one another and registered with respect to a second adjacent edge of the sheet of material. The members are then brought into contact with and laminated to the sheet of material. The improvements include feeding, cutting and supporting mechanisms for the flexible spine sheet member.

24 Claims, 12 Drawing Figures

SYSTEM FOR AND METHOD OF LAMINATING

The present invention relates generally to apparatus for and methods of laminating sheet materials, and more particularly to apparatus for and methods of aligning and laminating backing sheet members of different thicknesses in registration with respective portions of a cover sheet of material.

Various apparatus are commercially available, as well as methods are known, for making two piece laminates, such as game boards, each having a backing sheet member or blank secured by adhesive to one side of a cover sheet of material. The cover sheet of material (for convenience hereinafter referred to as a "wrapper") is often preprinted on its other side and is usually wrapped about the edges of the backing member. Some laminates, such as those formed in the manufacture of record jackets, require two backing sheet members to be secured in registration with different portions of a wrapper. The three piece laminate can then be folded and appropriately wrapped to form the finished product.

As described in U.S. Pat. Nos. 3,400,031 and 3,522,129, both assigned to the present assignee, when making laminates of the type including one support sheet member, it is necessary to properly align at least one edge of the backing sheet member with respect to the wrapper before bringing the two into contact with one another. Similarly, when making the two support sheet laminates it is likewise necessary to align the two support sheet members with at least one edge of the wrapper so that any preprinted material on the opposite side of the wrapper to which the support sheet members are attached will be properly positioned with respect to the support sheets. For example, when making record jackets, identification information is often provided on one edge of the jacket so that when the jackets are stacked against one another they still can be easily identified. Failure to properly align the wrapper and backing sheet members will result in misregistration of the identifying information.

A system which has been found to be accurate in providing high speed alignment and lamination of the one and two backing sheet members with a wrapper is described in U.S. Pat. Nos. 3,400,031 and 3,522,129. The system generally includes a high speed conveyor belt assembly so that the laminate can be made accurately at high speeds. A commercially available system based upon U.S. Pat. Nos. 3,400,031 and 3,522,129 is currently being sold by the present assignee as the "FB-1 Spotter."

Due to the present high capital costs of making bookcases (which typically include a wrapper, two cover backing sheet members and a spine backing sheet member) the need has arisen for a relatively inexpensive, accurate, high speed, automatic technique of and system for laminating these three backing sheet members to a wrapper. In such an automatic system and technique it is often necessary to accurately center the spine backing sheet member between two cover backing sheet members, while substantially aligning an edge of each member. The sheet members can then be registered and laminated to select and different portions of an adhesive coated side of a wrapper so that any printed material is precisely located, for example, on the spine of the resulting bookcase; both with respect to the back and front covers as well as the top and bottom edges of the spine. In this manner when the pages of text of a book are bound to the bookcase, any preprinted information on the spine will appear properly positioned with respect to the same information on all of the other bookcases.

In copending application U.S. Ser. No. 268,198 (incorporated herein by reference) filed simultaneously with the present application and assigned to the present assignee (hereinafter referred to as the Copending Application), an improved laminating apparatus and technique are described for making laminates having three relatively stiff backing sheet members secured to separate portions of a sheet of material. The apparatus is therefore extremely useful in making products such as bookcases. In particular, the apparatus secures the three sheet members in registration with respective portions of a surface of a sheet of material. One of the sheet members is precisely centered between the other two. Each member has an edge substantially aligned with an edge of the other members and the substantially aligned edges are positioned with respect to an edge of the sheet. The oppositely disposed outer edges of the other two sheet members are mutually spaced from one another by a preselected distance as well as positioned relative to an adjacent edge of the sheet.

The preferred apparatus disclosed in the Copending Application comprises a supply station including a supply tray for supporting a supply of the relatively stiff backing sheet members on one side of a conveyor belt. The supply station includes spacing elements so that the sheet members can be positioned on the tray in three stacks. The stacks are disposed in a predetermined spatial relationship with respect to one another as well as with respect to an articulating frame disposed over the conveyor belt. A lifting or pick-up assembly including vacuum cups is positioned above the three stacks for lifting at least a portion of one member from each stack. A transport assembly is movable between a first position above the lifting assembly and a second position above the articulating frame. The transport assembly includes vacuum cups and is in the first position when the lifting assembly lifts the three members into contact with the vacuum cups of the transport assembly. A vacuum is applied to the transport vacuum cups and the vacuum cups of the lifting assembly are subsequently released. The transport assembly then moves to its second position transferring the three sheet members (each with an edge leading the remaining portion of the member) from the supply station to the articulating frame. The articulating frame includes an alignment bar having a flat surface so that as the three sheet members move into the articulating frame the leading edges contact and are mutually aligned by the flat surface of the alignment bar. Further, two plowing or camming elements are provided which cooperate with the outer two sheet members disposed on opposite sides of the third member so as to move the two members transversely in their planes as the members are moved into contact with the alignment bar. The two members are moved such that the outer oppositely disposed edges of the two members are moved from a distance greater than a predetermined spacing to the predetermined spacing as the members are moved into contact with the alignment bar. Once in position in the articulating frame, a plunging bar including vacuum cups moves down into contact with the three sheets. As the plunging bar moves down, the center sheet member disposed in the articulating frame is gripped between a locating plate and a crowding bar or plate so as to precisely center the center sheet member. Specifically, when gripped the center member is oriented 90° with respect to the aligned edges of the other two sheet members. The previously aligned edge of the center member will remain substantially aligned with the corresponding edges of the other two sheet members, assuming that the center member is formed with square corners. A vacuum is applied through the plunging vacuum cups, and shortly thereafter the vacuum through the transport vacuum cups is withdrawn. The articulating frame is then positioned with respect to two adjacent edges of the wrapper and the plunging bar moves down. The center sheet is released from between the locating and crowding plates and the members are moved into contact with respective portions of the wrapper.

The laminate is subsequently wrapped, wherein the peripheral edges of the wrapper are folded over the edges of the backing sheet members. The laminating apparatus of the Copending Application is therefore extremely useful in the manufacture of bookcases wherein the center sheet member forms the spine backing member and the other two sheet members form respectively the front and rear cover backing members of each bookcase.

The apparatus of the Copending Application is therefore useful where the three sheet members of each laminate formed are of a relatively stiff material (such as cardboard), and are all substantially of the same thickness. Several problems, however, are encountered where two or more of the sheet members of each laminate are of different thicknesses and/or materials. For example, many bookcases employ stiff cardboard front and rear cover backing sheet members, while the spine backing sheet member is made of a more flexible strip of paper, which is substantially thinner than the cover backing sheet members.

The thinner material typically comes in predetermined widths on long supply rolls. The apparatus of the Copending Application does not lend itself to a roll of such material since the backing members are all provided in stacks on the supply tray. Further, the pick-up or lifting arms are adapted to travel approximately the same distance to each stack of members of the supply tray each time a set of members are to be lifted. Where the backing members are of different thicknesses, it is evident that if the backing members are initially provided in stacks at the same height, as the stacks are depleted, the relative heights of the stacks of members will vary posing problems with respect to the distance all of the pickup or lifting arms travel to contact and remove the top member of each stack.

Accordingly, it is an object of the present invention to modify the apparatus and technique of the Copending Application so that the apparatus and technique can provide laminates having backing sheet members of at least two different thicknesses.

Another object of the present invention is to provide an improved apparatus for and method of quickly and automatically making laminates of the type including three backing sheet members of at least two different thicknesses secured to select portions of a sheet of material such that at least one of the sheet members is cut to size from a roll of material as said laminates are made.

And another object of the present invention is to provide an improved apparatus for and method of making laminates of the type including a pair of stiff backing sheet members and a relatively thin backing sheet member secured in a predetermined spatial relation to select portions of a sheet of material.

Still another object of the present invention is to provide an improved apparatus for and method of making laminates of the type including a relatively flexible backing sheet member precisely centered between two relatively stiff backing sheet members when secured to respective portions of a sheet of material.

Yet another object of the present invention is to provide an improved apparatus for and technique of the type described in the Copending Application for making laminate articles adapted to be made into bookcases.

These and other objects of the present invention are achieved by an improved apparatus for and method of laminating sheet members to select portions of a sheet of material where at least one of the sheet members is made of a relatively flexible, thin material and dimensioned with a predetermined length. At least one other sheet member is made of a relatively stiff, thicker material. The apparatus of the present invention comprises support means at a first location for supporting the members, each at a respective first position. The support means includes flexible member support means for supporting the flexible sheet member. Lifting means are provided for lifting at least a portion of each sheet member from its respective first position to a respective second position. The lifting means includes means for moving the flexible member support means between the respective first and second positions of the flexible sheet member. The apparatus also includes feed means for feeding flexible material onto the flexible member support means at the first position and cutting means for severing the flexible material so that the flexible material supported by the flexible member support means is of the predetermined length so as to form the flexible sheet member. Finally, the apparatus includes transport means for transferring the sheet members disposed in the second position to a second location and means at the second location for registering and securing each of the sheet members to the respective portion of the sheet material.

The method of the present invention is an improved technique of making laminate articles of the type useful in making bookcases. The laminate includes front and rear backing sheet members, each made of a relatively stiff material and a spine backing sheet member made of a relatively flexible material, wherein the sheet members are secured to select portions of a sheet of material. The method comprises the steps of supporting at a first location at least two of the stiff sheet members on a first support and feeding a predetermined length of the flexible material onto a second support between the two stiff sheet members. The flexible material on the second support is severed to form the flexible sheet member. At least a portion of each of the stiff sheet members, and the second support are lifted so that all of the sheet members can then be transferred to a second location where they are registered and secured to the selected portions of the sheet of material.

These and other objects of the invention will in part be obvious and will in part appear hereinafter. The invention accordingly comprises the processes involving the several steps and the relation and order of one or more of such steps with respect to each of the others; and the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

In the drawings the same numbers refer to similar or like parts.

Figure 1A:
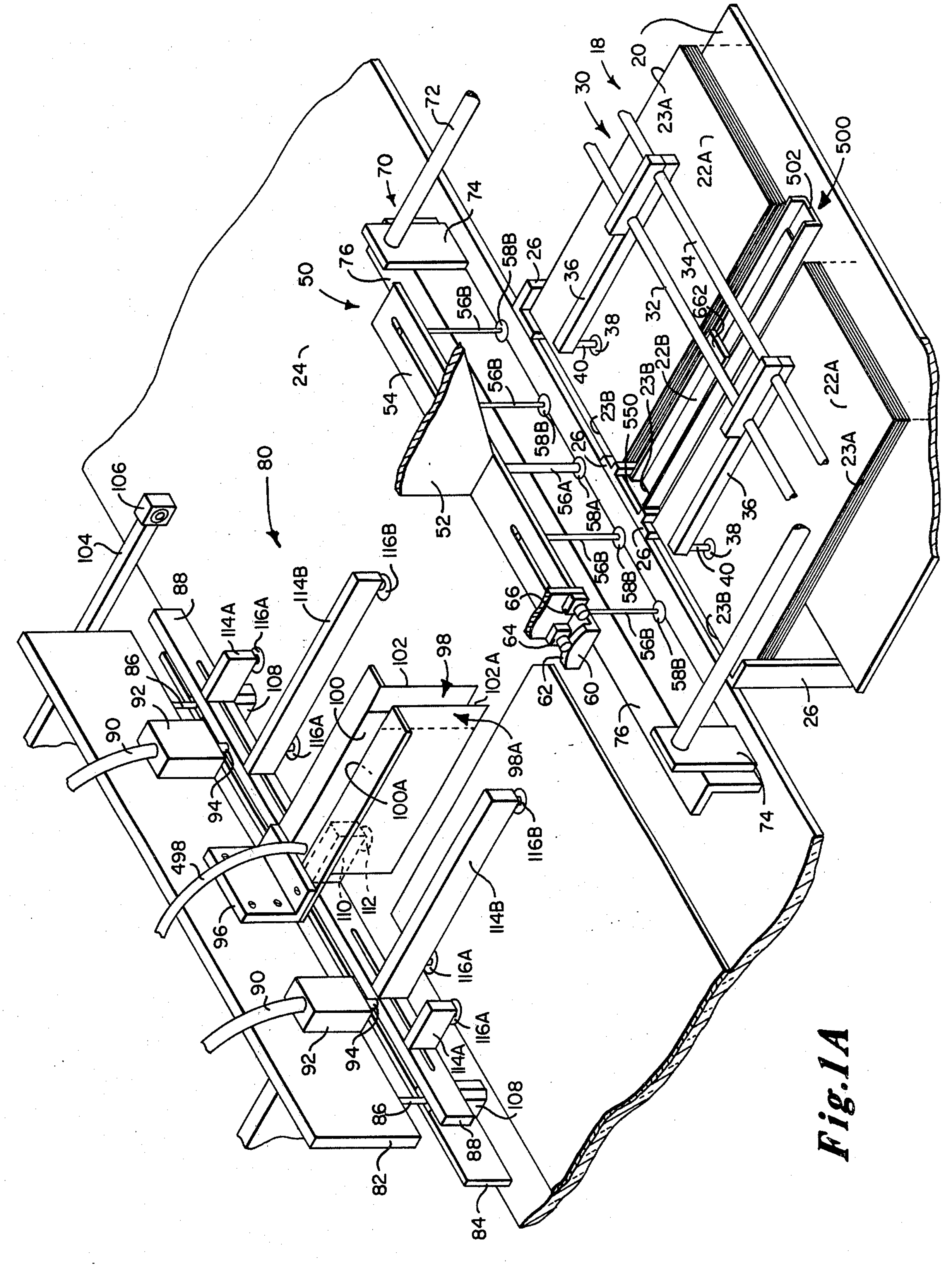
FIGS. 1A and 1B are respectively perspective views, partially cut away, of the laminating apparatus of the present invention in two of its operating positions.
Figure 1B:
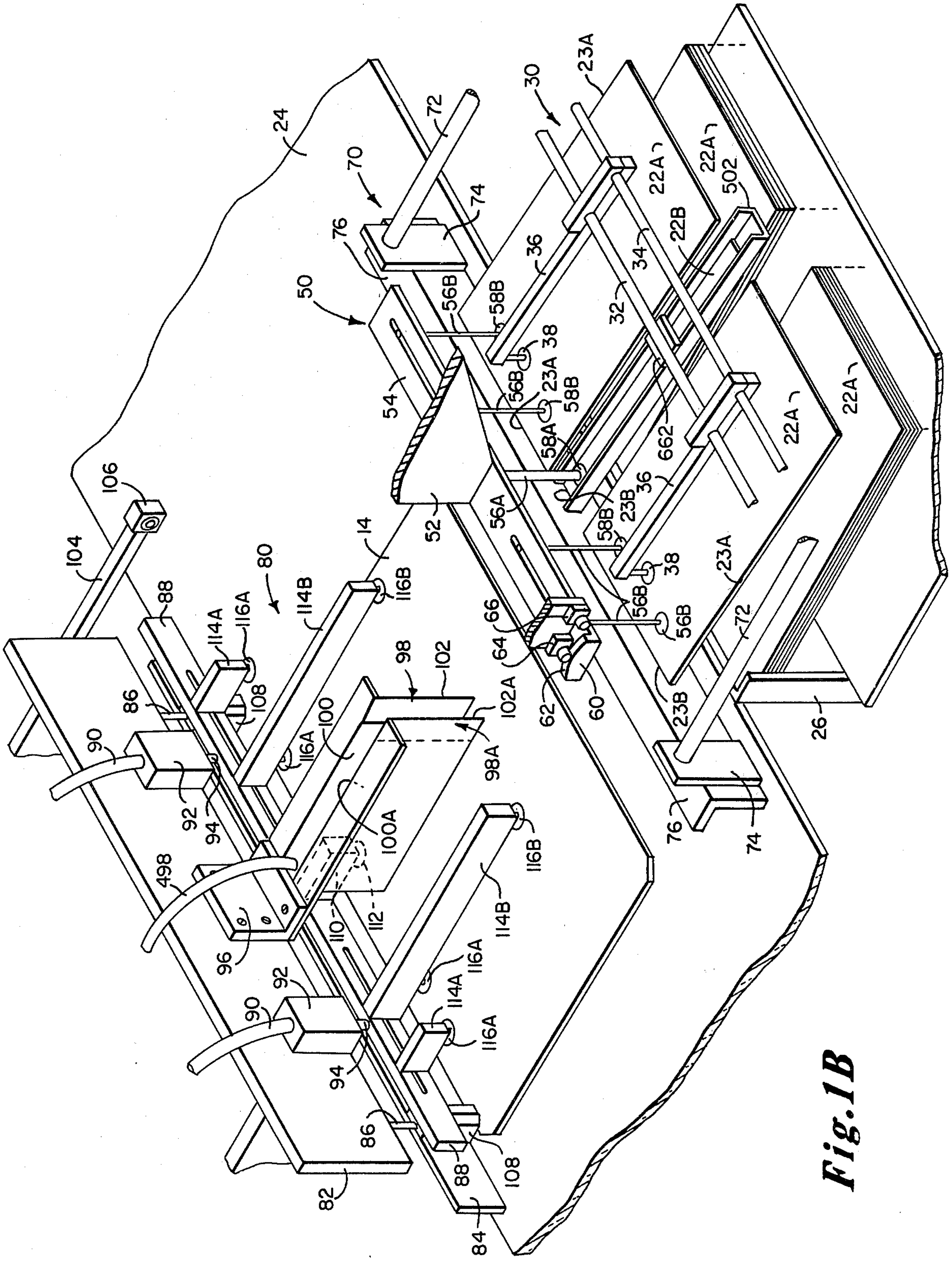

In FIGS. 1A and 1B, the system of the preferred embodiment includes a supply platform or tray platform 20 disposed in a supply station 18, for supporting two stacks of relatively stiff and thick backing sheet members 22A on one side of the conveyor belt 24. Conveyor belt 24 is adapted to periodically transport a sheet of material or a wrapper 14 into position with respect to the system so that a pair of members 22A and a flexible sheet member 22B disposed between members 22A can be properly registered with respect to two adjacent edges of the wrapper and then secured to the wrapper 14. The supply station is shown as including spacing elements 26 so that the sheet members 22A can be positioned on the tray 20 in two stacks with the edges 23B of the members being positioned closest to belt 24 and the edges 23A of members 22A being disposed as the outer opposing edges. The two stacks are disposed in a predetermined spatial relationship with respect to one another on opposite sides of the support trough or tray 502 of the support and positioning mechanism 500 for the flexible sheet member 22B, the mechanism 500 and tray 502 being described in greater detail hereinafter.

The preferred system also includes a lifting or pick-up assembly 30 comprising the front and rear pick-up holder shafts 32 and 34, respectively, suitably supported so that the shafts are generally parallel to one another. A pair of arms 36 are secured to both shafts 32 and 34, each positioned above a respective stack of members 22A on tray 20. A vacuum cup 38 is supported by a vacuum cup holder 40, which in turn is secured to each arm 36. The cups are disposed substantially in the same plane, with each cup 38 made of a flexible material, such as rubber, so that when the cup contacts the respective stiff member 22A and a suitable vacuum is applied through the corresponding holder 40, the member 22A can at least in part be lifted with the cup. Each holder 40 is made of a stiff material, such as metal, so that pressure can be applied by each arm 36 through the holder to force the respective cup against the member 22A and the vacuum held by the cup 38.

As described in the Copending Application, the pick-up assembly operates so that the front and rear shafts 32 and 34 move vertically up and down, generally in a direction normal to the center axes of the shafts. The front shaft 32 moves a greater distance than the rear shaft 34 so as to cause the arms 36 to move up and down and the individual cups 38 to move between a position above the corresponding stack of sheets 22A and a position where the cups 38 contact the top sheets 22A of the corresponding stack of sheets. Further, with each successive member 22A being removed from each stack on tray 20, the arms 36 will progressively move to a lower position with each stroke down to pick up the next set of members 22A. Accordingly, as described in the Copending Application means are provided for periodically raising the tray 20 in response to the amount the arms 36 travel.

A transport assembly 50 includes a transfer slide plate 52 for supporting the transfer bar 54. The latter supports a center vacuum cup holder 56A or for supporting vacuum cup 58A, and a pair of vacuum cup holders 56B, on each side of the center vacuum cup holder, for respectively supporting vacuum cups 58B. Cups 58A and 58B are identical to cups 38 of lifting assemmbly 30 and are preferably disposed substantially in the same plane with one another. The plane of cups 58A and 58B is disposed above and below the plane of cups 38, when the latter are respectively at their lowermost and uppermost positions. As described in the Copending Application, holders 56B are made of a material flexible enough to allow the cups 58B to move at least to a limited extent, transversely to the general elongated direction of the holder, while they are rigid enough so that the cup can be pressed against a stiff sheet member 22A and a vacuum applied.

As disclosed in the Copending Application the transfer bar 54 moves back and forth between (1) a first position (shown in FIG. 1B) wherein each pair of cups 58B are positioned near a cup 38 of the lifting assembly 30, while the center cup 58A is positioned above the tray 502 of the assembly 500, and (2) a second position (shown in the drawings of the Copending Application) wherein the transfer bar is positioned over the conveyor belt 24 adjacent the articulating frame 80.

The transport assembly 50 also includes cam plate 60 having camming surface 62 adapted to engage a first microswitch 64 and then a second microswitch 66 as the transfer bar 54 moves from the second position to the first position. The switches are adapted to remain closed while the transfer bar is disposed in the first position of FIG. 1B. The camming surface 62 will disengage microswitch 66 first and then microswitch 64 when the transfer bar moves from the first position back to the second position. The microswitches 64 and 66 are suitably mounted to structure not shown so that they are stationary with respect to the supply station 18.

A hold-up bar assembly 70 (described in detail in the Copending Application) includes hold-up bar shafts 72, each shaft being secured at its end to the mount arm 74. Each arm 74 is in turn secured to a corresponding end of the hold-up bar 76. Compression springs (not shown) are suitably connected to bias the hold-up bar to a position over belt 24 near articulating frame 80. The operation of the hold-up bar assembly is described in the Copending Application, wherein the hold-up bar 76 is moved between (1) a first position wherein the bar is positioned adjacent the stacks of members 22A, and (2) a second position wherein the hold-up bar 76 is positioned over the belt 24 so that it supports the trailing edges of the support members as they are moved over belt 24 toward articulating frame 80.

The articulating frame 80 includes a main frame member 82 including arms 86 for supporting alignment bar 84. Frame 80 also includes plunger bar 88.

Main frame member 82 has a pair of cables 90, each having its sheath secured to frame member 82 at 92, and its wire suitably secured to rod 94, which in turn supports the plunging bar 88. The latter is adapted to move up and down with respect to the main frame member 82 when the wire of each cable 90 moves with respect to its sheath as described in the Copending Application. Main frame member 82 includes a bracket 96 for supporting the upper edge of a substantially planar locating plate 98, the latter being connected so that its general plane is substantially normal to both the belt 24, as well as the direction of movement of the sheet members 22, as the latter are moved toward alignment bar 84. Plate 98 is beveled on one side 100 at the edge 102 of the plate closest to the supply of sheet members 22. An additional planar locating plate 98A identical to plate 98 is secured to main frame member 82 by bracket 96 so that the general plane of plate 98A is parallel to the general plane of plate 98. Surface 100A and beveled edge 102A are disposed opposite the respective surface 100 and edge 102. The spacing between surfaces 100 and 100A is approximately equal to or slightly smaller than the width of flexible sheet member 22B so that the latter will fit snugly between and be held by opposing surfaces 100 and 100A.

Light source—light detector units are provided on the main frame 82 in accordance with the teachings of U.S. Pat. No. 3,522,129. Specifically, a pair of light source light detector units (not shown) are suitably secured to the rear of the frame member 82 at spaced apart locations, while an arm 104 extends from the frame member 82 over the belt 24 where it supports a third light source—light detector unit 106.

A pair of camming or "plow" elements 108 are positioned on the alignment bar 84 by any suitable means, not shown. The spacing between plow elements 108 is set to a preselected distance equal to that prescribed spacing between outer opposing edges 23A of the two backing sheet members 22A of the finished laminate article. At least that portion of bar 84 between elements 108 is provided with a planar surface adapted to cooperate with the leading edges 23B of members 22A and 22B as they are moved into position by the transport assembly 50 so that the leading edges are all perfectly aligned.

The plunging bar 88 supports a center arm 110 attached to the bar by any suitable means. Arm 110 extends parallel to belt 24 and is provided with a vacuum cup 112 spaced from the bar 88 and a stopping block 113 at its end facing and adapted to contact the center vacuum cup holder 56A of the transport assembly 50. Plunging bar 88 also supports a pair of arms 114A and 114B on each side of the center arm 110. Each arm 114A and 114B is secured to the bar 88 by any suitable means so that the arms extend substantially parallel to center arm 110 and belt 24. Arms 114A are longer than arms 114B with each arm 114A and 114B provided with a vacuum cup 116A adjacent bar 88. Each arm 114A is also provided with a vacuum cup 116B at its end opposite bar 88. All of the cups 112 and 116 are disposed substantially in the same plane. The plane of the cups 112 and 116 is substantially parallel to belt 24 and is disposed above at least a portion of the alignment bar 84 when the plunging bar 88 is in its upper position. In this upper position, the cups 112 and 116 are above the plane of the cups 58 of the transport assembly 50.

As described in the Copending Application, after articulating frame 80 receives three backing sheet members, the plunging bar is lowered so that cups 112 and 116 contact the sheet members positioned therebelow. Vacuum is applied through cups 112 and 116 and the vacuum through cups 58 of transport assembly 50 released. Frame 80 is then movable in a parallel plane with respect to the wrapper sheet 14 disposed therebelow. To effect this movement the light source—light detector units (only unit 106 being shown) each provides a beam of light directed down onto the belt 24, where some of the light is reflected back toward the same unit. The belt 24 is made of a light absorptive material and wrapper 14 is made of a more reflective material. The threshold of each detector is set so that insufficient light (below the detector threshold) is reflected to the respective detector when the entire light beam strikes the belt below, while sufficient light (above the threshold of the detector) will be reflected to the respective detector when the beam strikes a portion of (i.e., the edge of) the wrapper 14. As described in U.S. Pat. No. 3,522,129 and the Copending Application, air cylinders (not shown) move the frame 80 in one direction parallel to the belt 24 and normal to an edge of wrapper 14 until the edge of wrapper 14 is located, and then in a direction parallel to the belt and normal to the first direction until an adjacent edge of the wrapper 14 is located. The sheet members held by cups 112 and 116 can then be lowered into contact with the respective portions of the adhesive back surface of the sheet 14 disposed below on belt 24.

The system to the extent described is substantially identical and operates in a similar manner to the system disclosed in the Copending Application, except for the following modifications:

(1) a center arm for lifting a relatively stiff center support member and similar to the arms 36 has been deleted;

(2) an arm pivotably supported at one end to the alignment bar 88 and including a camming plate for cooperating with the center cup holder 56A has been deleted;

(3) the stopping block 113 has been added to the end of center arm 110;

(4) the camming plate 60 and microswitches 64 and 66 have been added; and (5) the locating plate 98A has been substituted for a crowding plate pivotably secured to main frame member 82 and a camming pin mounted to the plunging bar 88 for moving the crowding plate has been deleted.

In addition to the support and positioning mechanism 500, the registration and laminating apparatus of the present invention includes air hose 498 mounted above locating plates 98 and 98A for periodically providing a blast of air down between the plates, as will be more evident hereinafter. The apparatus of the present invention also includes supply mechanism 504 for feeding flexible tape material, and a feed and cutting mechanism 506 for feeding and cutting a predetermined length of the flexible material in the tray 502 so as to form the flexible sheet member 22B.

Figure 2:
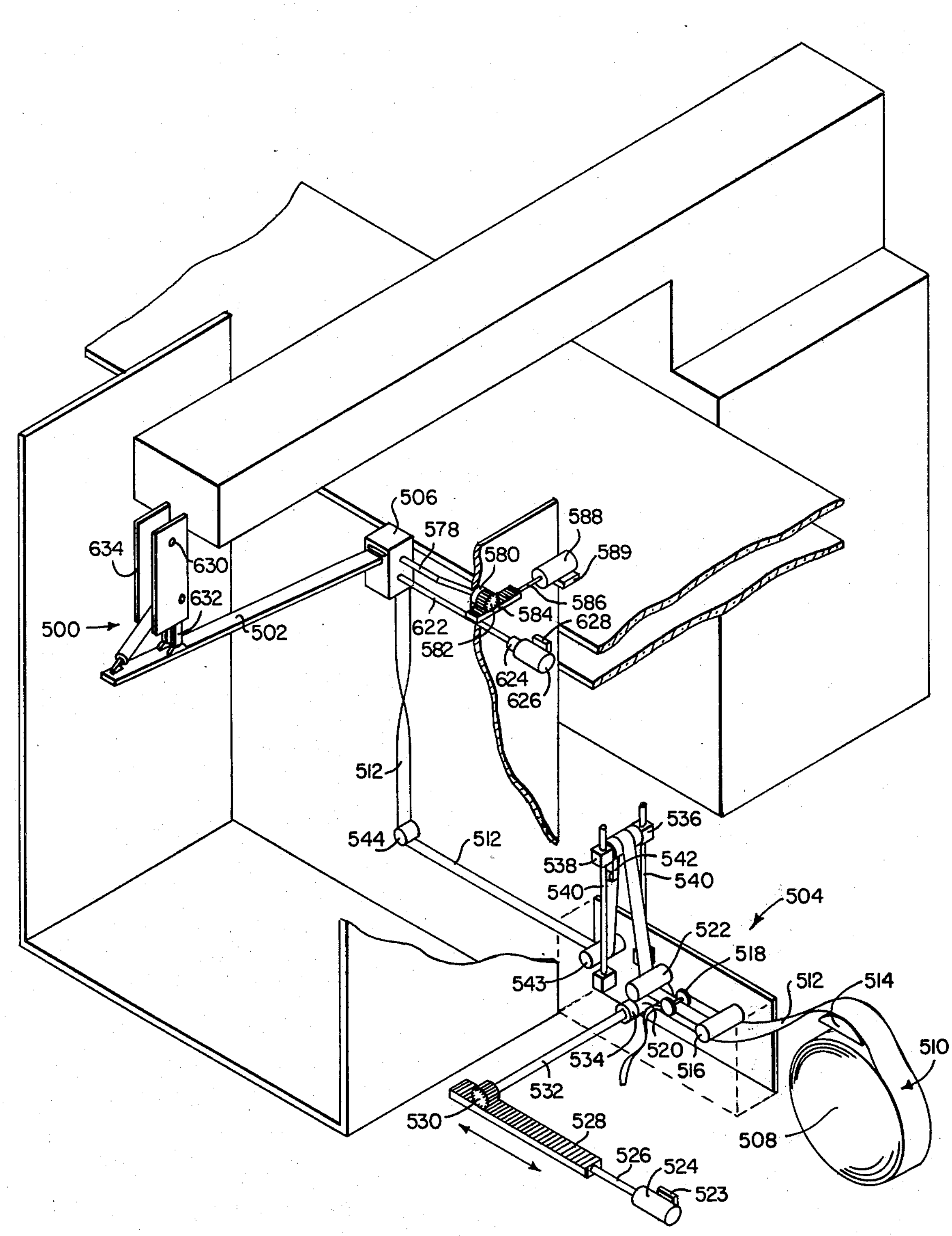
FIG. 2 is a perspective view of the feeding, cutting and positioning mechanisms of the laminating apparatus of the present invention.
Figure 9:
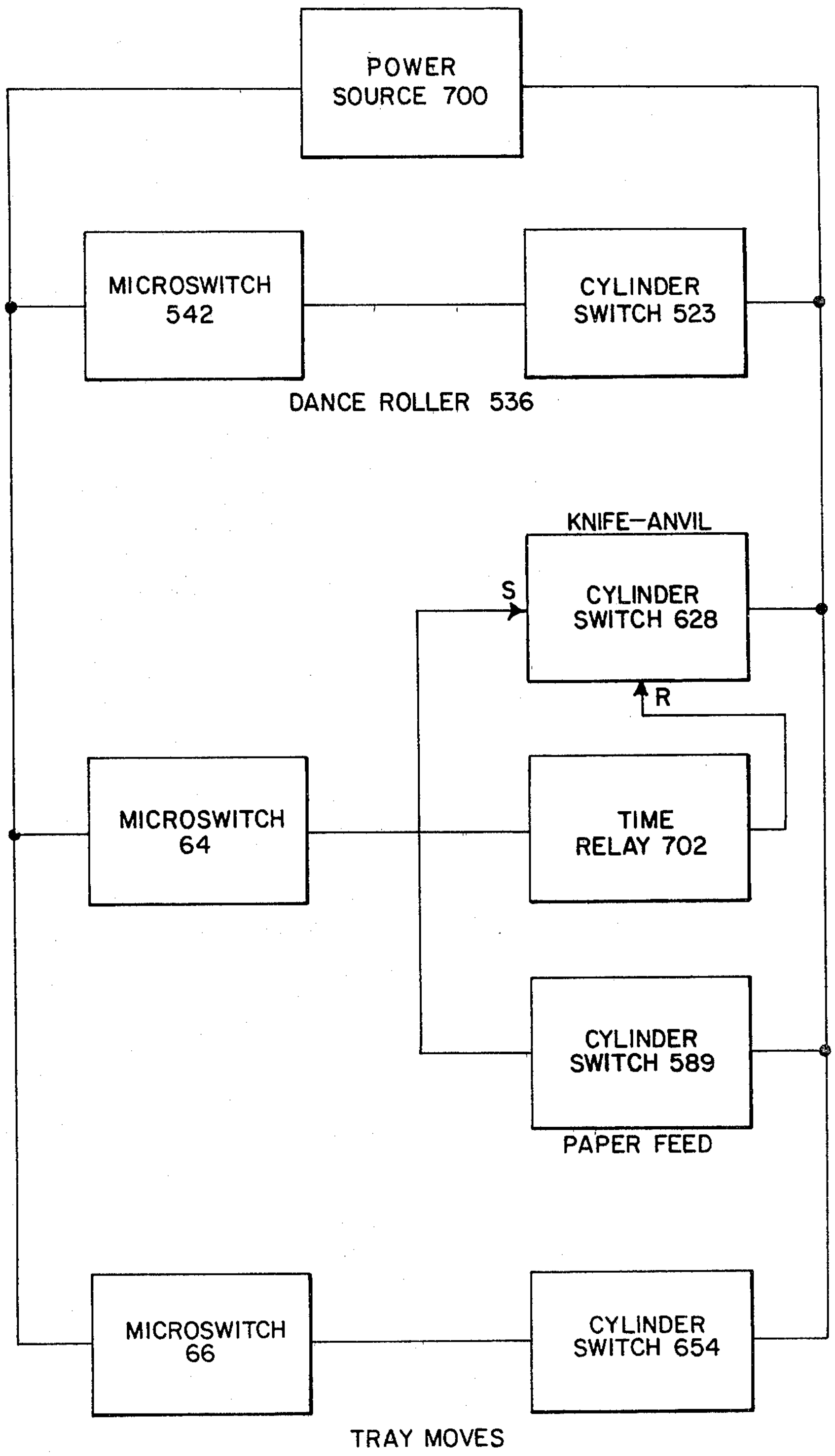
FIG. 9 is a block diagram of the electrical system of the present invention.

More particularly, referring to FIG. 2, the supply mechanism 504 includes a spindle 508 for supporting a supply roll 510 of flexible material 512 from which each flexible sheet member 22B is made. Flexible material 512 is guided over guide member 514 and under roller 516 through the width cutter 518 for cutting material 512 to the desired width. The cut material 512 is then fed between a pair of rollers 520 and 522. Roller 520 is rotatably driven by an electrically operated supply feed air cylinder 524 including the set-reset switch 523 and having its piston 526 connected to a rack gear 528. Gear 528 drivingly engages pinion gear 530 which rotates shaft 532. Shaft 532 drivingly engages one-way clutch 534, which in turn rotates roller 520 in a counter clockwise direction as shown in FIG. 2. Material 512 is fed from rollers 520 and 522 over dance roller 536. The latter is mounted in support 538 for vertical movement on the vertical support bars 540 and is spring biased in the upper position shown. A microswitch 542 engages support 538 when roller 536 is in its upper position and disconnects when roller 536 is moved down support bars 540. Microswitch 542 is suitably connected, as shown in FIG. 9, to switch 523 of supply feed air cylinder 524, so that piston 526 of cylinder 524 moves from an extended position to a retracted position when the switch 542 is open (dance roller 536 moves down), and from a retracted position to an extended position when the switch 542 is closed (dance roller 536 is in its upper position).

Material 512 is fed from dance roller 536 under roller 543 and thence under roller 544, whereupon the material is twisted 90° so that it can be fed into the feed and cutting mechanism 506. The latter is generally shown in FIG. 2, and in greater in FIGS. 3–7. Referring to FIGS. 3–7, mechanism 506 comprises an outer front plate 548 formed with a slit 550 and a slot 552 disposed below slit 550. Slit 550 is provided with an anvil 554 which forms the bottom edge of the slit. A bracket 556 is suitably attached to plate 548 so that mechanism 506 can be securely mounted with respect to the tray 502 of support and positioning mechanism 500. Side plates 558 are secured to front plate 548 in any suitable manner and to each other by three bolts 560, 562 and 564. A spring post 566 is provided on each side plate 558 and extends into the mechanism 506. A decurl unit 568 including three cylindrical rolls 570 is rotatably mounted about a center axis 572, the latter extending between and being substantially equally spaced from each of the axes of rolls 570. Handle 574 is provided outside of mechanism 506 adjacent plate 558B for rotating unit 568. A metal cylindrical roller 576 is mounted on and driven by a shaft 578. Shaft 578 is in turn rotatably mounted between plates 558. Referring to FIG. 2, drive shaft 578 is connected to the one way clutch 580, which in turn is connected to pinion gear 582. Pinion gear 582 is rotatably driven by rack gear 584. The latter, in turn, is connected to piston 586 of the electrically operated material feed air cylinder 588. Cylinder 588 includes the set-reset switch 589 suitably connected to microswitch 64 as shown in FIG. 9.

Figure 5:
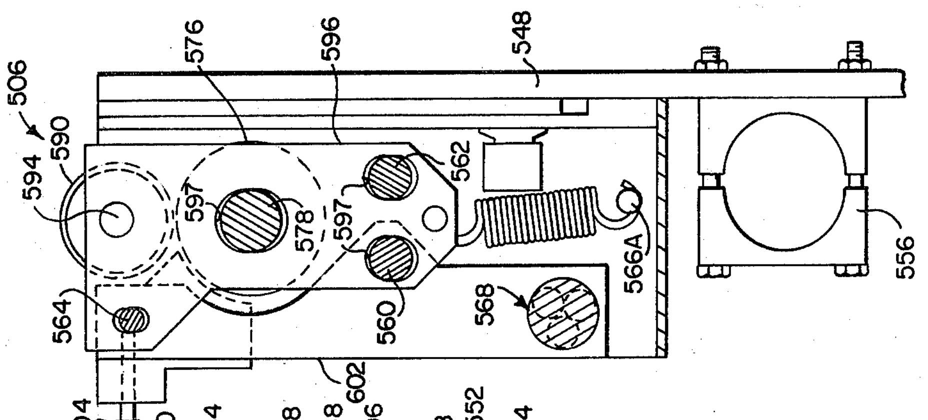
FIG. 5 is a cross-sectional view taken along line 5—5 in FIG. 3.

Referring again to FIGS. 3–7, the mechanism 506 further includes a pressure roller 590 preferably including elastomeric cover 592. Pressure roller 590 is mounted on center shaft 594, the latter being rotatably mounted in two intermediate plates 596 disposed between side plates 558. As best shown in FIG. 5, intermediate plates 596 include over-sized apertures 597 for receiving the bolts 560, 562 and 564 and shaft 578 so that the plates 596 are movable with respect to these bolts and shaft a limited amount in the vertical direction. Each plate 596 includes a spring post 598 spaced from the spring post 566 of the adjacent plate 558. A bias spring 600 is attached to each spring post 598 and the spring post 566 of the adjacent plate resulting in the roller 590 being biased against and frictionally engaging roller 576. A pair of guide plates 602 include apertures for receiving bolt 560, decurl unit 570 and bolt 562. Plates 602 are adjustably mounted between the intermediate plates 596. The planes of both guide plates are both substantially parallel to one another and normal to the axis of rotation of both rollers 576 and 590. The shape of each plate 602 is contoured around the roller 576 and 590, close to the rollers, so that material 512, guided by plates 602, can be fed through rollers 576 and 590. The relative position of guide plates with respect to one another is easily adjusted by means of set screws 604 which engage bolt 564.

Figure 7:
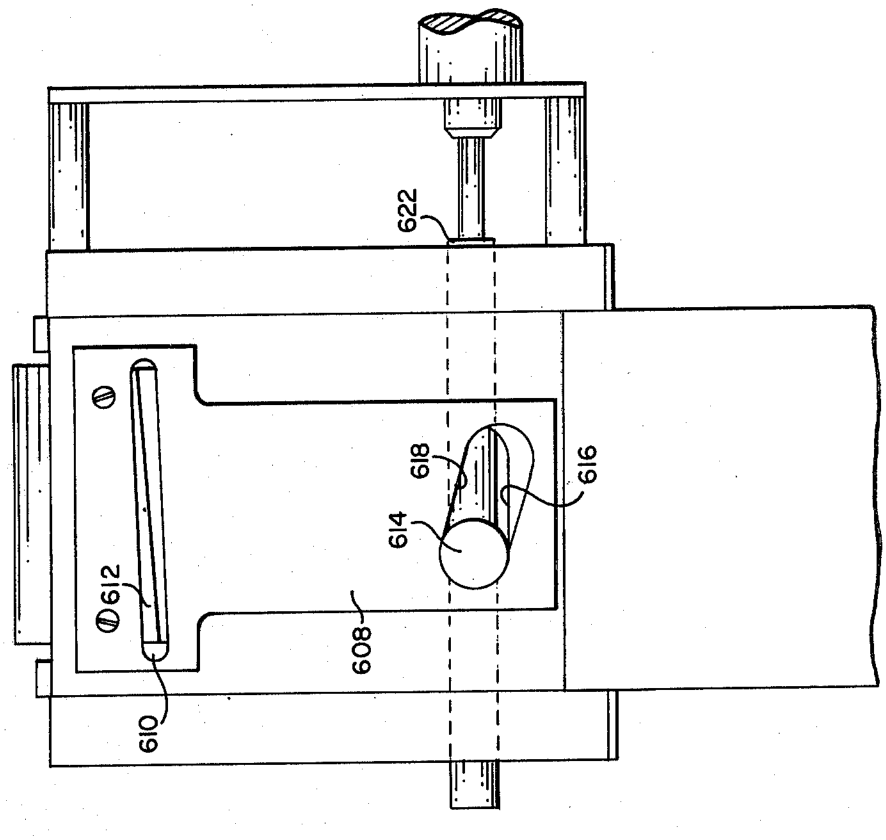
FIG. 7 is a cross-sectional view similar to FIG. 6 to illustrate the anvil and cutting blade of the cutting mechanism in a second relative position.
Figure 6:
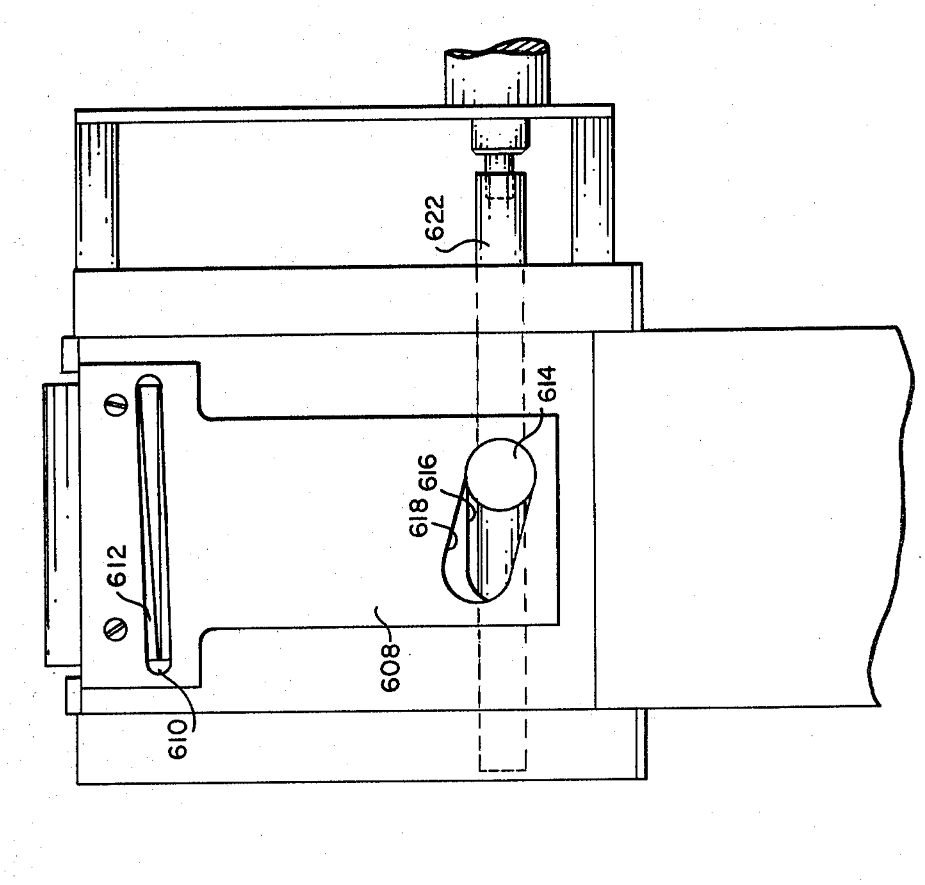
FIG. 6 is a cross-sectional view taken along line 6—6 of FIG. 5 to illustrate the anvil and cutting blade of the cutting mechanism in one relative position.

The mechanism 506 also includes an inner front wall plate 606 having a slit 607 aligned with slit 550 of outer front plate 548 and a movable blade plate 608 disposed between the inner plate 606 and the outer plate 548. As best shown in FIGS. 6 and 7 blade plate 608 includes a horizontally oriented slit 610 and a knife blade 612 secured to the plate so that the blade edge extends across the top of slit 610 at a slight angle to the horizontal.

The blade plate 608 is mounted for movement between inner plate 606 and plate 548 (shown in FIG. 4) so that it is movable between a first position (shown in FIGS. 4 and 6) wherein the horizontally oriented slit 610 is substantially aligned with slit 607 of inner plate 606 and slit 550 of outer plate 548 allowing material 512 to pass therethrough, and a second position (shown in FIG. 7) wherein the edge of knife blade 612 is below the anvil 554.

Figure 4:
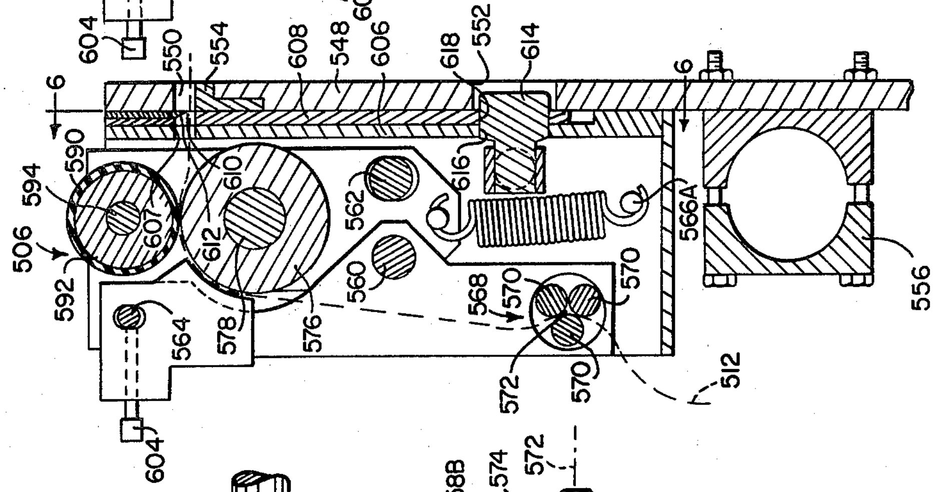
FIG. 4 is a cross-sectional view taken along line 4—4 in FIG. 3.
Figure 3:
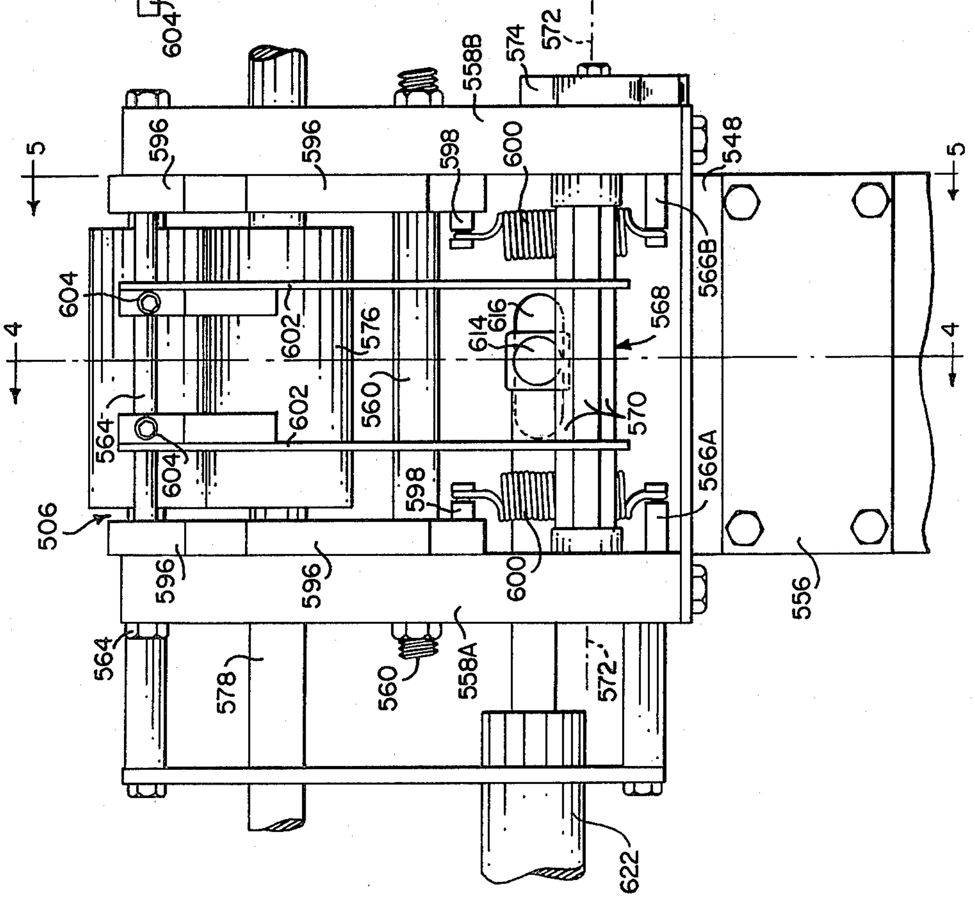
FIG. 3 is a rear view of the feed and cutting mechanism shown in FIG. 2.

The means for moving the blade plate 608 between the first position shown in FIGS. 4 and 6 and the second position shown in FIG. 7 includes a piston 614. Piston 614 extends through a horizontally oriented slot 616 formed in the inner plate 606, through cam slot 618 formed in blade plate 608 transversely to the horizontally oriented slot 552 of plate 548. The piston is connected to the horizontally movable shaft 622 as shown in FIG. 3. The latter extends through side plate 558A where it is coupled as shown in FIG. 2 to a piston 624 of cutting air cylinder 626. The latter is operated by an electrically-operated set-reset switch 628 connected in any suitable manner to switch 64 as shown in FIG. 9. As shown in FIG. 4, the material 512, indicated as a dotted line is fed between two and one rolls 570 of the decurl unit 568. The material is guided by plates 602 and fed between rollers 576 and 590. The material is fed from roller 576 and 590 through slits 607, 610 and 550 onto tray 502 of the support and positioning mechanism 500 as shown in FIG. 1A.

The mechanism 500 is best shown in FIGS. 2, 8A, 8B, and 8C. Tray 502 is secured in the supply station 18 to a pair of bracket arms 630 pivotably mounted about the pin 632 within support frame 634. Front and rear adjustable limit set screws 636 and 638 (shown in FIGS. 8A, 8B and 8C) are suitably secured to frame 634 so that the pivotable movement of bracket arms 630 is limited by the screws. The tray 502 is pivotably mounted about pin 640 between the bottom ends of brackets 630. The amount tray 502 can be pivoted about pin 640 is limited by screw 642 connected to tray 502 and movable within the bracket 644, which in turn is secured to the arms 630. The movement of screw 642 is adjustably limited by upper nut 646 and lower nut 648. Tray air cylinder 650, having a piston 652 and an electrically-operated set-reset switch 654, has one end pivotably connected at 656 to frame 634 in front of bracket arms 630 and its other end pivotably connected at 658 to the back of tray 502 behind the arms 630. The front of tray 502 indicated at 660 is adapted to receive the strip of material 512 from mechanism 506.

The top of tray 502 is provided with a stop element 662 adapted to contact front pick-up holder shaft 32 when the tray is pivoted upwardly about pin 640. A stopping block 663 is provided on element 662 for engaging the center vacuum cup holder 56A of the transport assembly 50, as will be described hereinafter. Finally, means are provided in the tray 502 for holding the strips of material 512 cut to form members 22B. For example, apertures 664 can be formed in the bottom of the tray 502. Manifold 666 is attached to the bottom of the tray for applying a vacuum to the material in the tray through apertures 664 during movement of the tray, as will be more evident hereinafter.

The electrical system is shown in FIG. 9. Power source 700 is suitably connected to microswitches 542, 64 and 66. Switch 542 is in turn connected to the set-reset switch 523 of supply feed air cylinder 524, the latter being connected back to source 700. Source 700 is also suitably connected to switch 64, which in turn is connected to the set-reset switches 589 and 628 of the respective material feed and cutting air cylinders 588 and 626. Switch 64 is also connected to time relay 702, which in turn is connected so that an output from relay 702 resets switch 628. Switches 628 and 589 are in turn connected to source 700. Finally, microswitch 66 is suitably connected to the set-reset switch 654 of tray air cylinder 650, with switches 66 and 654 being connected to power source 700.

A decription of the operation of the apparatus in connection with FIGS. 1–9 will facilitate an understanding of both the apparatus and method of the present invention.

Figure 8A:
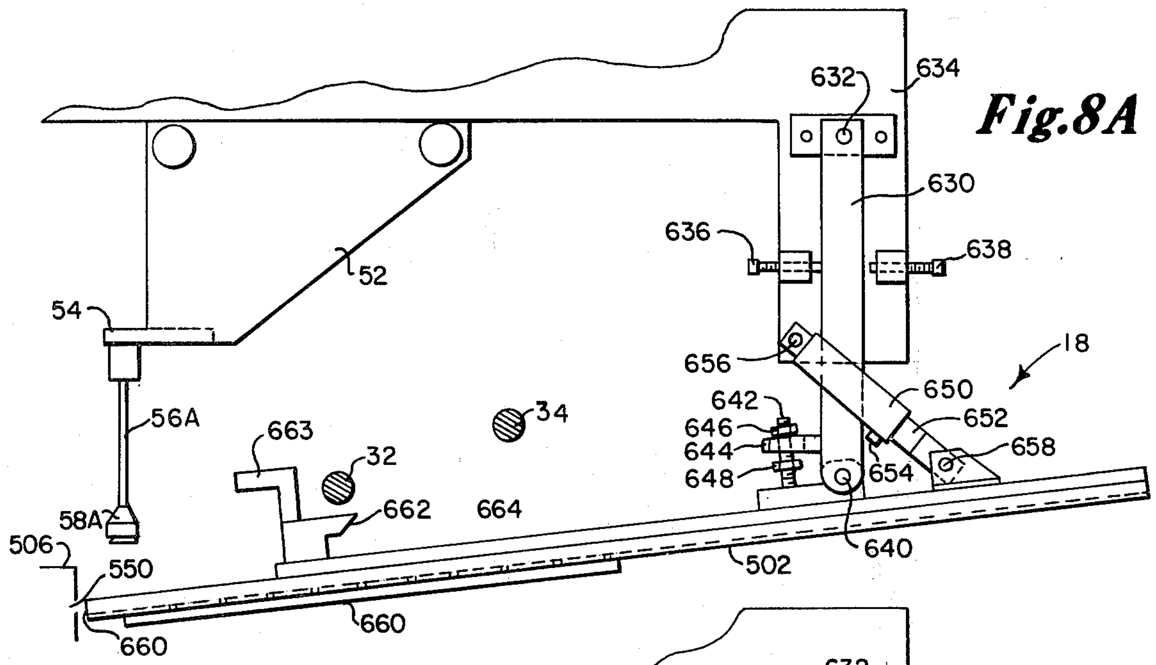
FIGS. 8A, 8B and 8C are cross-sectional views to show the sequential positioning of the support for the flexible sheet member relative to the transport means and the feeding and cutting mechanism.

As shown in FIGS. 1A and 1B, the stacks of sheet members 22A are provided between spacer elements 26 on tray 20. In FIG. 2 a roll 510 of material 512 is mounted on spindle 508 and fed over guide element 514 under roller 516 and through cutter 518. From cutter 518 the material 512 is fed between rollers 520 and 522, over dance roller 536, under rollers 542 and 543 and twisted 90°. As best seen in FIG. 4, material 512 is then threaded through mechanism 506 by inserting the material between two and one of the rolls 570 of the decurl unit 568. From decurl unit 568 the material extends between guide plates 602 and is fed between rollers 576 and 590. From rollers 576 and 590 the material extends out slits 607, 610 and 550. End 660 of tray 502 will be positioned just below slit 550 as shown in FIG. 8A, when the piston 652 of tray air cylinder 650 is fully retracted so that the material 512 fed by mechanism 506 extends onto tray 502. For purposes of explanation it is assumed that a predetermined amount of material 512, equal to the length of member 22B, has been fed through the slits 607, 610 and 550, through open end 660 onto tray 502, while the latter is in its lower position shown in FIG. 8A. This is the situation where microswitches 64 and 66 are both open, ie., the transfer bar is positioned between station 18 and articulating frame 80. As shown in FIGS. 1A and 1B, as transfer bar 54 moves toward station 18 to pick up a pair of relatively stiff sheet members 22A and the flexible sheet member 22B, cam surface 62 of cam plate 60 first contacts switch 64. As shown in FIG. 9, closing switch 64 causes the switch 628 to close, operating cutting air cylinder 626 so that piston 624 moves to its extended position. In FIG. 2, piston 624 causes shaft 622 to move, moving the piston 614 horizontally in slot 552 of plate 548 and slot 616 of inner plate 606. Piston 614 also moves in cam slot 618 so that blade plate 608 moves from its upper position shown in FIG. 6 to its lower position in FIG. 7. This movement of plate 608 causes the knife edge of blade 612 to move from a position above anvil 554 to a position below the anvil. Because the knife blade 612 is angled with respect to the anvil it cleanly severs the material 512 disposed in the slots providing the member 22B in tray 502.

The closing of switch 64 also energizes time relay 702 which after a predetermined period of time resets switch 628 of cutting air cylinder 626. Piston 624 moves to its retracted position. This results in shaft 622 and piston 620 moving in an opposite horizontal direction so that the plate 608 moves from its lower position in FIG. 7 to its upper position in FIG. 6. A clear path is thus provided so that material 512 can be fed through slits 607, 610 and 550, as described hereinafter.

Finally, when switch 64 closes, the switch 589 (shown in FIG. 2) closes, so that piston 586 is moved to its extended position. However, rotation of gear 582 in this direction disengages one way clutch 580 so that shaft 578 and the paper feed roller 576 do not move.

As transfer bar 54 continues to move toward station 18, cam surface 62 of cam plate 60 next contacts and closes switch 66. Closing switch 66 will result in switch 654 (shown in FIGS. 8A, 8B, and 8C) of the tray air cylinder 650 to close. This results in piston 652 moving toward its extended position, from the position shown in FIG. 8A, through the position FIG. 8B to the position shown in FIG. 8C. Specifically, as the piston 652 moves to an extended position, the bracket arms 630, previously resting against set screw 636, pivot about pin 632. This results in tray 502, and in particular the end 660 of the tray, moving away from slot 550 of the cutting mechanism in the direction of arrow 670 in FIG. 8B, so as to clear the mechanism 506. This movement of tray 502 continues until bracket arms 630 are stopped by set screw 638. The piston 652 continues its stroke to the extended position causing tray 502 to pivot about pin 640 as shown by arrow 672, so that front end 660 of the tray pivots up until stop member 662 contacts shaft 32.

Approximately at this point in time the transfer bar 54 has moved such that the vacuum cup holder 56A contacts the stopping block 663, and cup 58A and cups 58B are in position to receive the respective members 22. The pick-up assembly 30 will have operated in the same manner as taught in the Copending Application so that arm members 36 extend down and vacuum cups 38 contact the top member 22A of each stack, and a vacuum is applied through cups 38 to hold the members 22A.

Figure 8B:
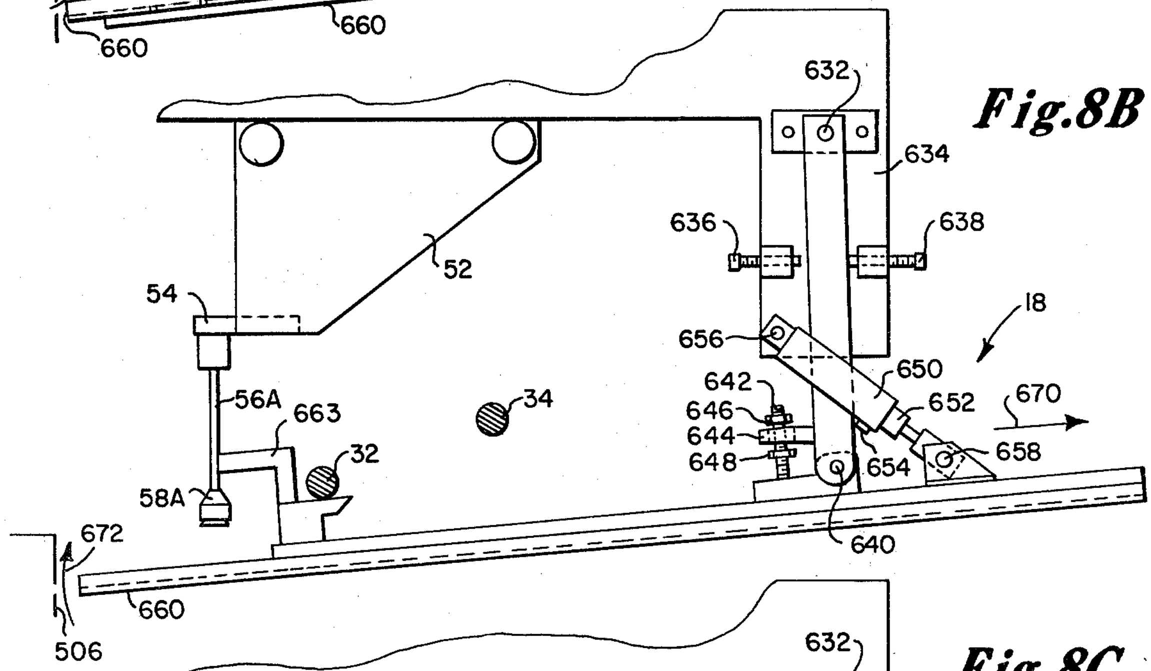
Figure 8C:
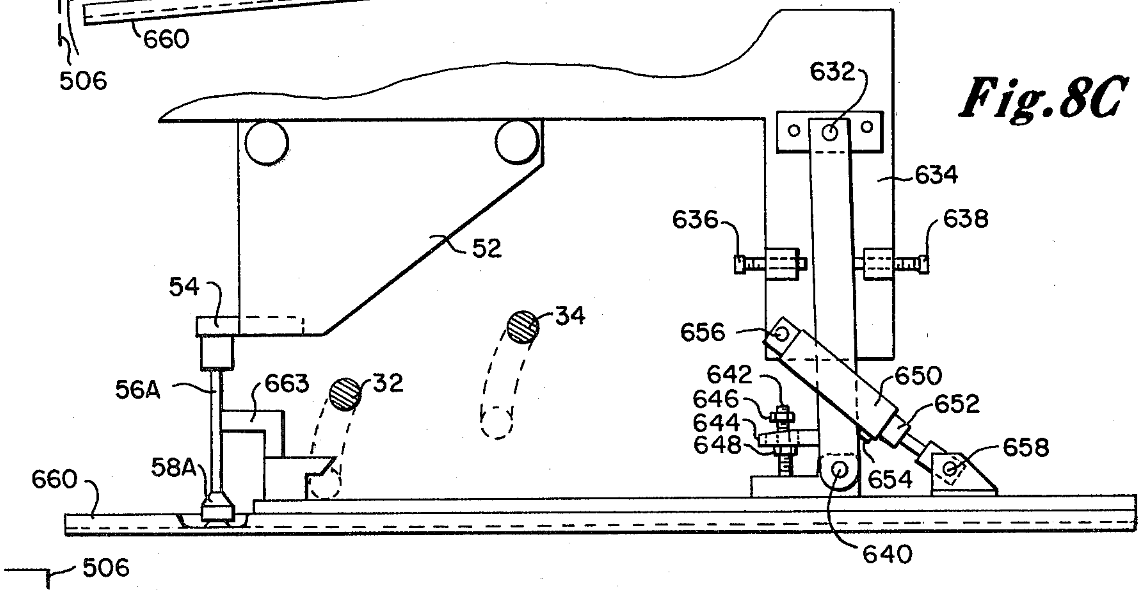

In the same manner a vacuum is applied through manifold 666, through slots 664 to hold the member 22A in place as the tray moves through the sequence shown in FIGS. 8A–8C.

As the pick-up arms 36 raise the leading edges of sheet members 22B into contact with the respective cups 58B, shaft 32 moves upwardly, allowing the end 660 of tray 502 to continue to rise until nut 648 contacts bracket 644. The latter is adjusted so that the member 22B in tray 502 moves into contact with the center vacuum cup 58A of the transport assembly 50 as shown in FIG. 8C. Since the vacuum cup holder 56A is stopped by the block 663, the transfer bar 54 will not over ride and the exact positioning of the cup 58A on the flexible member 22B will be provided. A vacuum is next applied through the cups 58A and 58B. The vacuum through cups 38 of the lifting assembly and through manifold 660 of the tray is subsequently released while the shafts 32 and 34 (see FIG. 8C) as well as arms 36 continue to rise. In this regard the tray 502 is restrained by bracket 644 engaging nut 648 as shown in FIG. 8C. The relatively stiff members 22A and flexible member 22B now held by the transport assembly 50 is next transfered toward articulating frame 80.

As transfer bar 54 moves toward frame 80, cam surface 62 of cam plate 60 first disengages microswitch 66 opening the latter. When switch 66 opens, switch 654 of tray air cylinder 650 is reset and piston 652 is retracted. As piston 652 is retracted, tray 502 moves in the reversed sequence shown in FIGS. 8A–8C, wherein stop member 662 disengages shaft 32 and the end 660 of the tray pivots in an opposite direction from that shown by arrow 672 shown in FIG. 8B. Once in the intermediate position shown in FIG. 8B, the bracket arms 630 pivot so that tray 502 moves forward. Tray 502 stops when bracket arms 630 are stopped by screw 636 whereupon end 660 of tray 502 is now positioned in front of slit 550 of cutting mechanism 506.

Transfer bar 54 continues to move toward frame 80 so that cam surface 62 of plate 60 disengages microswitch 64 opening the latter. This results in switch 589 (shown in FIG. 2) of paper feed air cylinder 588 being reset, and the piston 586 of that cylinder moving to its extended position. This in turn rotates pinion gear 582 in a direction which engages clutch 580 causing shaft 578 to rotate, thereby driving the roller 576. This forces paper to be fed through slot 550 onto the tray 502. In this regard it should be appreciated that the length of the material fed onto tray 502, ie. the length of sheet member 22A can easily be adjusted by adjusting the stroke length of the piston 586 of material feed air cylinder 588.

As paper is fed by rollers 576 and 590 onto tray 502, the tension on material 512 pulled from roll 510 increases, pulling dance roller 536 down. This results in microswitch 542 becoming disengaged, which in turn resets switch 523 of paper feed air cylinder 524. Resetting switch 523 causes piston 526 to move to a retracted position. This rotates shaft 532 engaging one-way clutch 534 so as to rotate roller 520 feeding material 512 toward dance roller 536. This will relieve the tension on material 512 causing roller 536 to rise until microswitch 542 is engaged and closed.

Once switch 542 is closed, switch 523 is closed, causing piston 526 to move to an extended position rotating pinion gear 530 and shaft 532. However, rotation of shaft 532 in this direction results in disengagement of clutch 534 so that roller 520 remains stationary. Use of the feed roller 520 and its driving mechanism thus ensures substantially constant tension on material 512 fed into mechanism 506.

Referring again to transport assembly 50 of FIGS. 1A and 1B, cam plate 60 is now clear of microswitches 64 and 66 as bar 54 moves toward articulating frame 80. As described in the Copending Application hold up bar assembly 70 operates so that bar 76 extends out over belt 24 holding up the trailing edges of members 22. As members 22 are moved into articulating frame 80, the corner formed by outer edge 23A and leading edge 23B of each member 22A will contact a camming element 108. As members 22A move into contact with elements 108, members 22A will be moved transversely in their planes (due to the flexible nature of holders 56B) until leading edges 23B of members 22A contact and are aligned by the planar surface of alignment bar 84. Since the spacing between elements 108 is equal to the precise spacing desired between outer opposing edges 23A of members 22A these edges are now in their precise relative position.

In addition, as transfer bar 54 moves toward articulating frame 80, the leading edge 23B of flexible member 22B is transferred between opposing surfaces 100 and 100A of the locating plates 98 and 98A. Bevelled edges 102 and 102A of the plates facilitate the insertion of the flexible member 22B between the plates.

As described in the Copending Application, the plunging bar 88 is then lowered sufficiently so that the cups 112 and 116 contact the respective members 22A and 22B. Because member 22B fits snuggly between surfaces 100 of plates 98 sufficient friction is provided to hold the flexible member in place so that the center cup 112 contacts the flexible member. A vacuum is then applied through these cups 112 and 116 and the vacuum through cups 58 of the transport assembly is withdrawn. Next, the light source-light detectors (detector 106 being shown) are used to align the entire articulating frame 80 with respect to two adjacent edges of the wrapper 14 positioned on belt 24 below. The plunging bar 88 then moves down toward wrapper 14 and is secured to the respective portions of the wrapper. In order to ensure that member 22B clears plates 98, a blast of air is provided by air hose 498.

The laminate thus provided will have the flexible member 22B precisely centered between the two relatively stiff members 22A. The edges 23B of the members will be substantially aligned with one another as well as with respect to an edge of the wrapper 14, assuming the center member 22B is made with squared corners. The outer opposing edges 23A will be precisely spaced from one another as well as from an adjacent edge of wrapper 14.

The belt 24 can then be energized and the laminate wrapped as described in the Copending Application. Further, the transfer bar 54 will have begun to move back toward the supply station 18 where the operation repeats itself.

The foregoing system and technique is respectively an improved apparatus for and method of making laminates having backing members of at least two different thicknesses, at least one of the members being made of a relatively flexible material. While the invention has been described as useful in making laminates for use in making bookcases, it will be appreciated that it can be useful in making any type of laminate having backing sheet members of at least two different thicknesses and flexibilities. The flexible material is fed from the roll 510, cut to its desired width by cutter 518, decurled by decurl unit 568, and cut by knife blade 612 interacting with anvil 554. The precise length of flexible material 512 is fed onto tray 502 and is cut by the knife blade 612 and anvil 554 cleanly along the leading edge 23B of the resulting member 22B. The pair of crowding plates 98 provides a convenient technique of precisely centering and holding flexible member 23B while the plunging bar 88 moves down and cup 112 contacts the flexible member. Air hose 498 ensures that the member clears the plates 98 as plunging bar moves downwardly toward wrapper 14.

Since certain changes may be made in the above apparatus and method without departing from the scope of the invention herein involved, it is intended that all matter contained in the above description or shown in the accompanying drawing shall be interpreted in an illustrative and not in a limiting sense.

What is claimed is:

1. Apparatus for laminating sheet members respectively to select portions of a sheet of material, at least one of said sheet members being made of a relatively flexible and thin material of a predetermined length, and at least one other of said sheet members being made of a relatively stiff and thicker material, said apparatus comprising, in combination:

supporting means at a first location for supporting said members, each at a respective first position, said supporting means including flexible member support means for supporting said flexible member;

lifting means at said first location for lifting at least a portion of each sheet member from said first position to a respective second position, said lifting means including means for moving said flexible member support means between the respective first and second positions of said flexible member;

feed means for feeding flexible material onto said flexible member support means at said first position;

cutting means for severing said flexible material so that said flexible material supported on said flexible member support means is of said predetermined length so as to form said flexible member;

transport means for transferring said sheet members disposed in said second position to a second location; and means at said second location for registering and securing each of said sheet members to the respective select portion of said sheet of material.

2. Apparatus according to claim 1, wherein said flexible member support means includes a first tray for supporting said at least one flexible member, said supporting means further includes a second tray for supporting said at least one stiff member, said means for moving said flexible member support means includes means for moving said first tray between said first and second positions and said lifting means further includes means for lifting at least a portion of said at least one stiff member from its first position on said second tray to said second position.

3. Apparatus according to claim 2, wherein said first tray is a trough for supporting said flexible member and disposed above said second tray.

4. Apparatus according to claim 2, wherein said means for moving said first tray includes an air cylinder.

5. Apparatus according to claim 2, wherein said cutting means is positioned adjacent said first tray when said first tray is at said first position and said means for moving said first tray moves said first tray away from said cutting means so that said flexible member is disposed in an intermediate position and then moves said tray so that said flexible member moves from said intermediate position to said second position.

6. Apparatus according to claim 2, wherein said feed means includes means for supporting a roll of said flexible material, a pair of rollers mounted to receive and frictionally engage said flexible material therebetween, means for intermittently rotatably driving at least one of said rollers so that said flexible material is pulled by said rollers and pushed onto said first tray, and said cutting means includes a knife edge positioned between said rollers and said first tray for cutting said flexible material.

7. Apparatus according to claim 6, further including means for biasing said pair of rollers together.

8. Apparatus according to claim 6, wherein said cutting means further includes an anvil, said knife edge being positioned on one side of said flexible material and said anvil being positioned on the opposite side of said flexible material as said rollers feed material onto said first tray, and means for providing relative movement between said knife edge and said anvil.

9. Apparatus according to claim 8, wherein said means for intermittently driving said at least one roller includes a first air cylinder having a piston mechanically coupled to said roller, and said means for providing relative movement includes a second air cylinder having a piston mechanically coupled to one of said knife edge and said anvil.

10. Apparatus according to claim 9, further including means cooperative with said transport means for energizing said first and second air cylinders.

11. Apparatus according to claim 10, wherein said predetermined length of said flexible member is determined by the stroke of said piston of said first air cylinder.

12. Apparatus according to claim 6, wherein said flexible member is of a predetermined width, said apparatus further including second cutting means disposed between said roll of material and said first tray for cutting said material to said predetermined width.

13. Apparatus according to claim 6, further including means for providing substantially constant tension on said flexible material pulled by said pair of rollers.

14. Apparatus according to claim 13, wherein said means for maintaining substantially constant tension includes (1) means for pulling said flexible material from said roll, (2) a dance roller disposed between said pair of rollers and said roll of material, said dance roller being responsive to change in tension of said material when said material is pulled by said pair of rollers, and (3) means responsive to the position of said dance roller for pulling tape from said roll of material when said dance roller responds to increased tension in said material.

15. Apparatus according to claim 6, further including means for decurling flexible material provided from said roll of material.

16. Apparatus according to claim 15, wherein said means for decurling is adjustable.

17. Apparatus according to claim 1, further including a conveyor belt for periodically moving a sheet of said material into said second location.

18. Apparatus according to claim 1, wherein said transport means transfers each of said sheet members from said first location to said second location with an edge of each said member leading the remaining portion of said member.

19. Apparatus according to claim 18, wherein said cutting means severs said flexible material along said leading edge of said flexible member formed.

20. Apparatus according to claim 18, wherein said means for registering and securing each of said sheet members includes means for defining a planar surface, and wherein said transport means is adapted to move the leading edges of said stiff sheet members into contact with said planar surface so as to align said leading edges of said stiff members with respect to one another.

21. Apparatus according to claim 20, wherein said means for registering and securing each of said sheets futher includes means for precisely centering said flexible sheet member between two of said stiff sheet members.

22. Apparatus according to claim 21, wherein said means for precisely centering said flexible sheet member includes a pair of locating plates disposed so that (1) said transport means moves said flexible sheet member between said locating plates, and (2) the spacing between said locating plates is such that said flexible member is received between and frictionally held by said locating plates.

23. Apparatus according to claim 22, further including means for moving said sheet members into contact with the respective portions of said sheet of material and including means for dislodging said flexible sheet member frictionally held between said locating plates.

24. A method of registering and laminating a laminate article useful in making a bookcase of the type comprising front and rear cover backing sheet members, each made of a relatively stiff material, and a spine backing sheet member made of a relatively flexible material, wherein the backing sheet members are secured to select portions of a sheet of material, said method comprising the steps of supporting at a first location at least two of said stiff sheet members on a first support;

feeding a predetermined length of said flexible material onto a second support between said two stiff sheet members;

severing said flexible material on said second support to form said flexible sheet member;

lifting at least a portion of each of said cover backing sheet members to a respective pick-up position and moving said second support so that said flexible sheet members is moved to its respective second position;

transferring said backing sheet members to a second location;

precisely centering said spine backing sheet member with respect to each said front and rear cover backing sheet members and aligning at least one edge of each front and rear sheet member with respect to each other at said second location;

registering said sheet members with said respective portions of said sheet of material; and laminating said sheet members with said respective portions of said sheet of material to form said laminate.

* * * * *